US006764197B1

(12) United States Patent
Zemar (10) Patent No.: US 6,764,197 B1
(45) Date of Patent: Jul. 20, 2004

(54) SPOTLIGHT FOR USE IN ILLUMINATING ORNAMENTAL DISPLAYS

(76) Inventor: Raymond A. Zemar, 2833 S. Eleanor, Chicago, IL (US) 60608

( * ) Notice: Subject to any disclaimer, the term of this patent is extended or adjusted under 35 U.S.C. 154(b) by 0 days.

(21) Appl. No.: 10/242,854

(22) Filed: Sep. 13, 2002

(51) Int. Cl.[7] .................................................. F21L 4/00
(52) U.S. Cl. ....................... 362/159; 362/183; 362/186; 362/197
(58) Field of Search ................................ 362/183, 186, 362/190, 191, 197, 202, 287, 427, 159

(56) References Cited

U.S. PATENT DOCUMENTS

| | | | | |
|---|---|---|---|---|
| 4,410,930 A | * | 10/1983 | Yachabach | 362/145 |
| 6,007,216 A | * | 12/1999 | Donnelly | 362/191 |
| 6,174,070 B1 | * | 1/2001 | Takamura et al. | 362/183 |

* cited by examiner

Primary Examiner—Stephen Husar
Assistant Examiner—Anabel Ton (57) ABSTRACT

An ornamental spotlight essentially comprised of a cylindrical protective housing with a light source assembly mounted at one end and a removable cap, for inserting rechargeable batteries in the hollow cylinder, located at the other end. The light source has a lamp, a reflector for collecting and reflecting a maximum amount light from the lamp, and a projection type lens for projecting a spot of light on to the display. Either dc or ac powered lamps can be used in the spotlight. Zoom capability can be added for adjusting the size of the spot on to the display. Rechargeable batteries are used to supply power to the spotlight at nighttime with a solar panel and battery charger being used to charge the batteries during the daytime. A light-sensor switch or timer circuit is wired into the power line to automatically turn the spotlight on at dusk and off in the daybreak. The spotlight has a mounting and adjusting base for attaching the structure and adjusting it through 360-degrees in latitude and at least 90-degrees in elevation.

20 Claims, 6 Drawing Sheets

SPOTLIGHT FOR USE IN ILLUMINATING ORNAMENTAL DISPLAYS

BACKGROUND OF THE INVENTION

1. Field of the Invention

The present invention relates to display lighting for use in connection with illuminating ornamentatal displays. The ornamentation spotlight has particular utility in connection with illuminating flags and other patriotic displays for nighttime presentation.

2. Description of the Prior Art

The desire by Americans to fly the U.S. flag has increased considerably since 9/11. Many people would like to display the flag at night rather than having to take it down. It is appropriate to display the American flag at night as long as it is properly lighted. This brings about an increasing need for an improved spotlight for illuminating the flag and other ornamentation displays.

The use of lighting apparatus for the illumination of flags is known in the prior art. For example, U.S. Pat. No. 3,752,975 to Meyer discloses a flagpole light that is mounted on top of the pole and has a reflector that directs the light downward in a circular pattern around the flag. However, the Meyer '975 patent does not produce a focused spotlight directed specifically on the flag, but rather illuminates a circular volume around the pole from above, and as disclosed has further drawback of requiring electrical power be wired from a 110-volt source of a house.

U.S. Pat. No. 6,227,683 to Tukia discloses a flagpole light that is also mounted on top of the flagpole and reflects light down on to the flag from above. However, the Tukia '683 patent does not produce a focused spotlight directed specifically on the flag, but rather illuminates a circular volume around the pole from above.

Similarly, U.S. Pat. No. 5,988,100 to Schmitt discloses an apparatus for supporting and illuminating display flags. However, the Schmitt '100 patent discloses an internally lighted flag mast that reflects light out towards the flag and does not produce a focused spotlight directed specifically on the flag from down below the flag.

Lastly, U.S. Pat. Nos. 5,564,816 to Arcadia et al., D376,122 to Stine et al., and 3,923,001 to Murdock disclose apparatus that may be of general interest and pertinent to the construction and design of the present invention. The Arcadia '816 patent discloses an illuminated memorial ornament (cross) that is made from hollow tubes with lighting mounted inside the tubes and shinning out through holes in the tubes. The Stine '122 patent discloses the design of a solid flag display with lights built into the display. Finally, the Murdock '001 patent discloses a flagpole that automatically lowers the flag at night. However, none of these patents disclose an external spotlight that produces a focused spot of light directed specifically on to the flag being displayed.

While the above-described devices fulfill their respective, particular objectives and requirements, the aforementioned patents do not describe a flag illumination system that produces a focused spot of light on to the displayed flag or other display ornament.

Therefore, a need exists for a new and improved ornamentation spotlight that can be used to brilliantly illuminate a flag or other ornamental display. In this regard, the present invention substantially fulfills this need. In this respect, the ornamentation spotlight according to the present invention substantially departs from the conventional concepts and designs of the prior art, and in doing so provides an apparatus primarily developed for the purpose of illuminating flags and other ornamental displays.

SUMMARY OF THE INVENTION

In view of the foregoing disadvantages inherent in the known types of flag illumination apparatus now present in the prior art, the present invention provides an improved ornamentation spotlight, and overcomes the above-mentioned disadvantages and drawbacks of the prior art. As such, the general purpose of the present invention, which will be described subsequently in greater detail, is to provide a new and improved ornamentation spotlight and illumination system, which has all the advantages of the prior art mentioned heretofore and many novel features that result in an ornamentation spotlight and illumination system which are not anticipated, rendered obvious, suggested, or even implied by the prior art, either alone or in any combination thereof.

To attain this, the present invention for an ornamental spotlight essentially comprises a cylindrical protective housing with a light source assembly mounted at one end and a removable cap, for inserting rechargeable batteries in the hollow cylinder, located at the other end. The light source has a lamp, which can be incandescent, Xenon, metal halide, or other conventionally used lamp, a reflector for collecting and reflecting a maximum amount light from the lamp, and a projection type lens for projecting a spot of light on the display. Either dc or ac powered lamps can be used in the spotlight. The lens can have zoom capability for adjusting the size of the spot on to the display.

Batteries are used to directly supply power to dc type lamps or to a power inverter, which then supplies power in the case of ac type lamps. Photovoltaic solar cells are used to fully charge the batteries during daytime. The batteries then supply power to the light at night. Optionally, the spotlight can be wired to a 110-volt power line with rectifiers and/or power inverters used to supply appropriate power to the lamp. A photodetector switch or timer circuit is wired into the power line to automatically turn the spotlight on at night and off in the daytime.

The cylindrical housing mounts to a rotational base plate that is attached to a swivel-mounting base used for attaching the spotlight to a house, building, or other structure. The mounting apparatus allows the spot light to be rotated through 360-degrees in latitude and at least 90-degrees in elevation.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention is to provide a new ornamentation spotlight that provides in the apparatuses and methods of the prior art some of the advantages thereof, while simultaneously overcoming some of the disadvantages normally associated therewith.

It is another object of the present invention to provide a new and improved ornamentation spotlight that may be easily and efficiently manufactured and marketed.

An even further object of the present invention is to provide a new and improved ornamentation spotlight that has a low cost of manufacture with regard to both materials and labor, and which accordingly is then susceptible of low prices of sale to the consuming public, thereby making such equipment economically available to the buying public.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–6, a preferred embodiment of the ornamentation spotlight of the present invention is shown and generally designated by the reference numeral 10.

Figure 1:
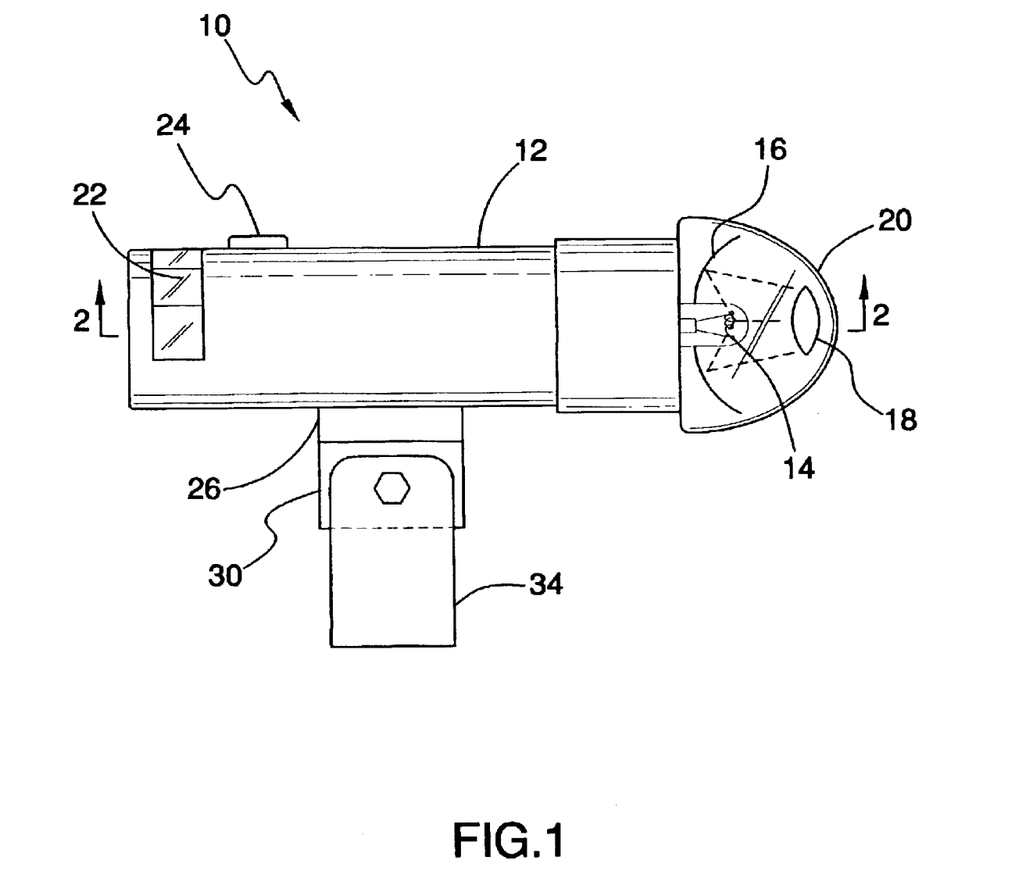
FIG. 1 is a side view of the ornamentation spotlight of the preferred embodiment that is constructed in accordance with the principles of the present invention.
Figure 2:
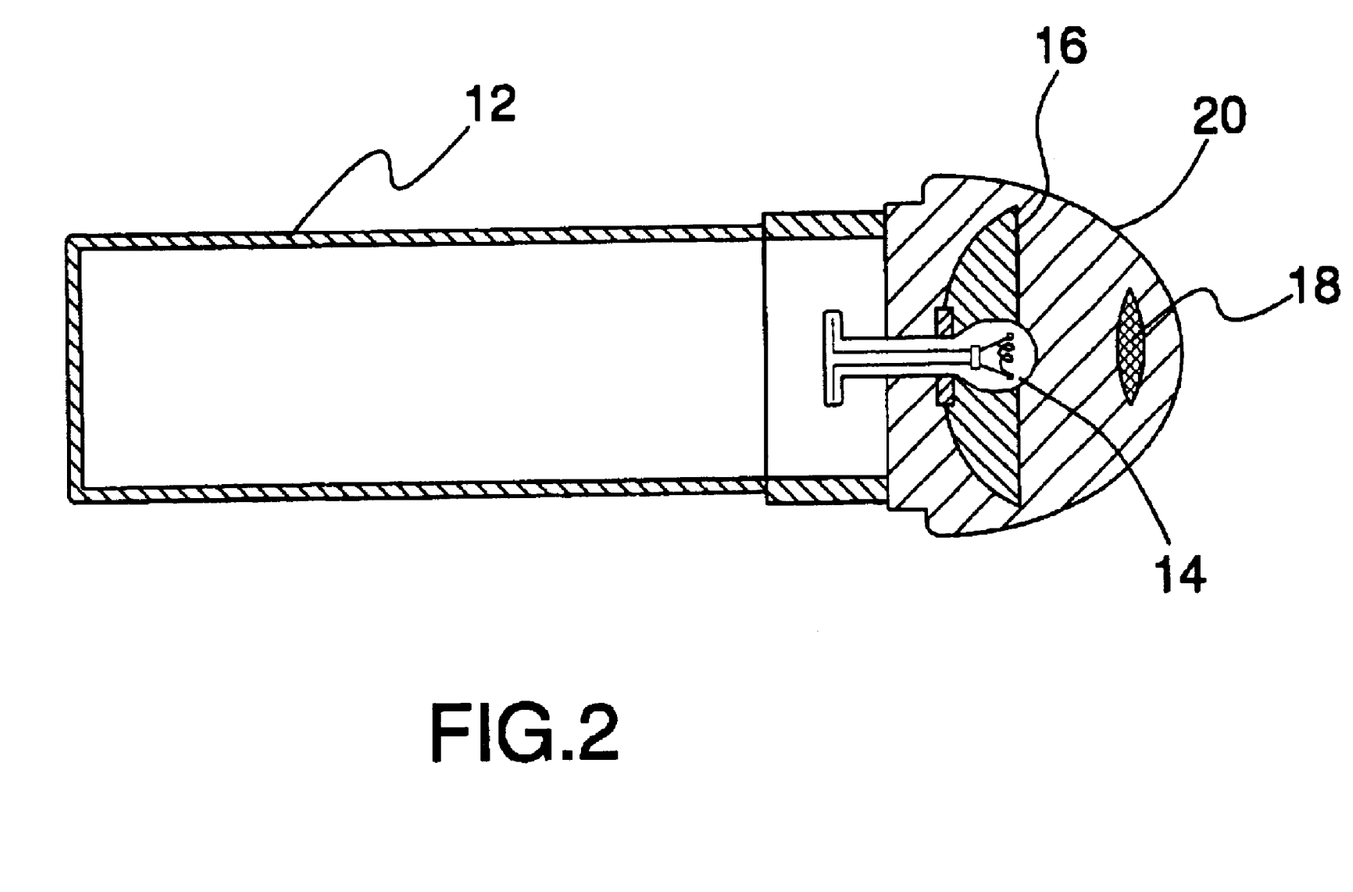
FIG. 2 is a cross-sectional side view of the ornamentation spotlight of the present invention.

In FIGS. 1 and 2 a regular side view and a cross-sectional side view, respectively, of a new and improved ornamentation spotlight 10 of the present invention for use in illuminating flags and other ornamental displays are shown and will be described. More particularly, the ornamentation spotlight 10 is comprised of a cylindrical protective housing 12 with a light source assembly mounted at one end and a removable cap, for inserting rechargeable batteries in the hollow cylinder, located at the other end. The light source has a lamp 14, which can be incandescent, Xenon, metal halide, or other conventionally used lamp, a reflector 16 for collecting and reflecting a maximum amount of light from the lamp 14, and a projection type lens 18 for projecting a spot of light on to the display. Either dc or ac powered lamps can be used in the spotlight. The lens can have built-in zoom capability for adjusting the size of the spot light to match the display. The light source assembly has a removable clear plastic outer dome 20 to protect the assembly from the weather and other damaging objects.

A solar panel 22, made up of photocells, is used to charge the batteries, installed inside the cylindrical housing 12, during the day. A photodetector 24 activation switch then supplies power to the lamp at night.

The cylindrical housing 12 mounts to a upper rotational base plate 26 that is mated to a lower rotational base plate 30, which is further attached to a swivel mounting base 34 used for attaching the spotlight to a house, building, or other structure.

Figure 3:
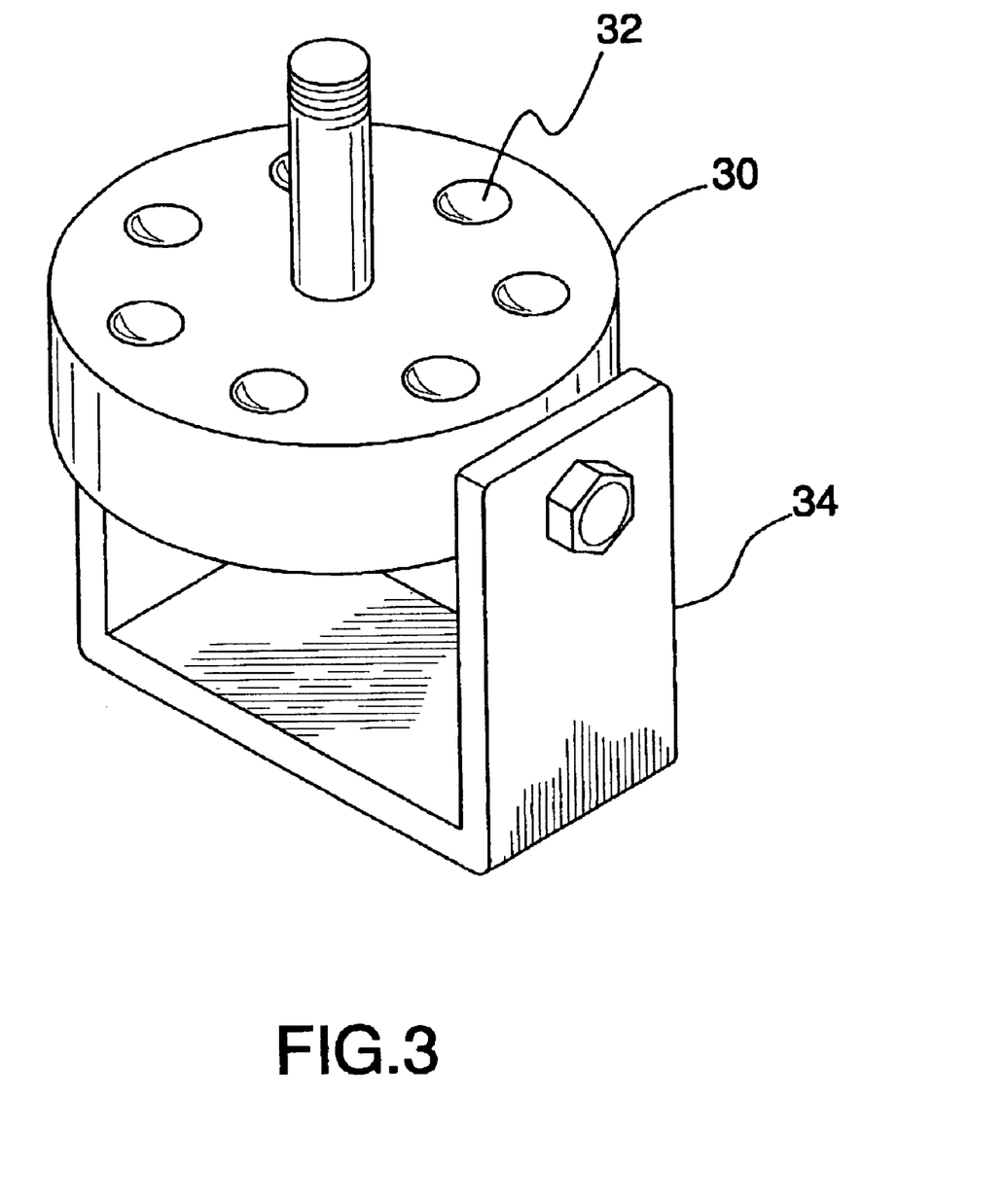
FIG. 3 is a perspective view of the swivel mounting base and lower rotational mounting plate for the ornamentation spotlight of the present invention.
Figure 4:
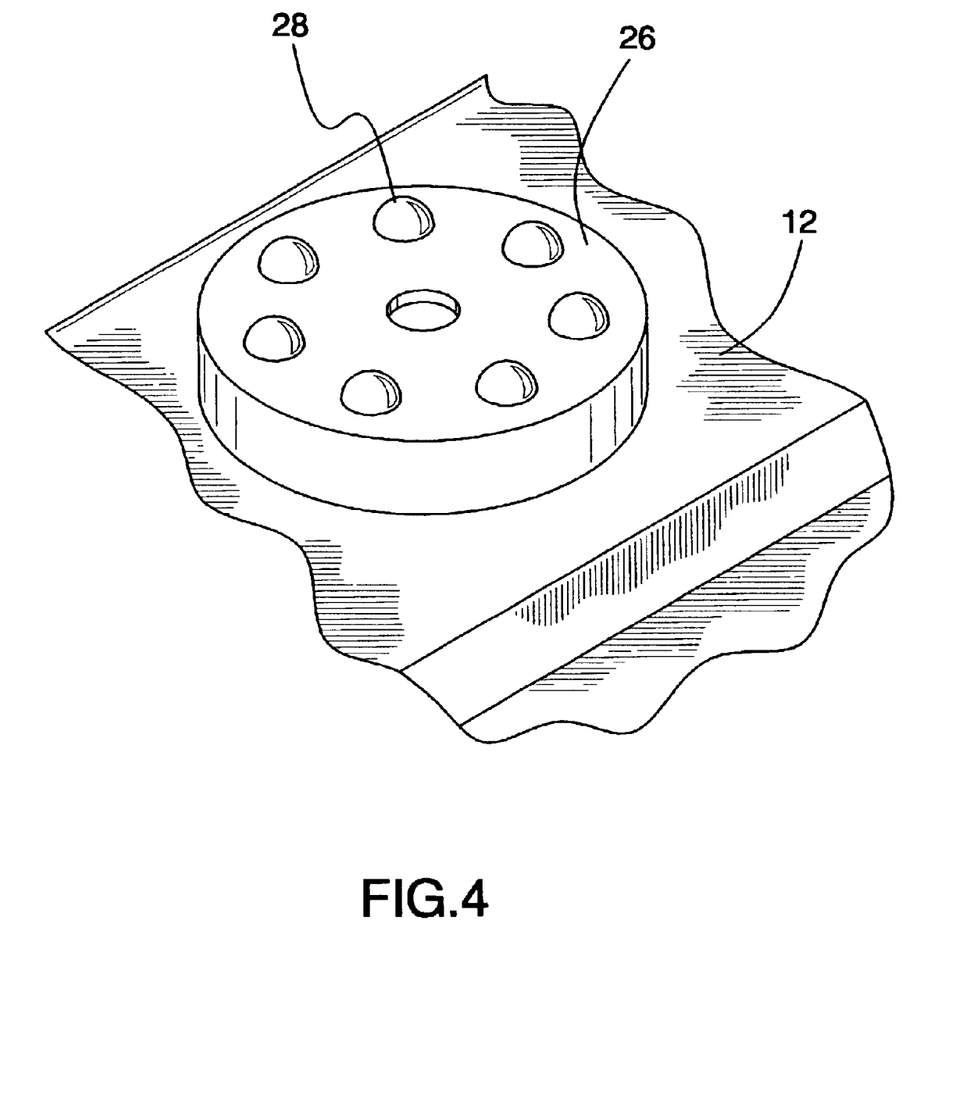
FIG. 4 is a drawing showing the upper rotational mounting plate for the ornamentation spotlight of the present invention.

FIGS. 3 and 4 are drawings showing further detail of the swivel-mounting base 34 with attached lower rotational mounting plate 30 and the upper rotational mounting plate 26, respectively, for the ornamentation spotlight of the present invention. The upper rotational mounting plate 26 has a series of convex alignment bumps 28 extending upward from the surface around the perimeter that fit into a matching series of concave alignment dimples 32 located around the perimeter of the lower rotational mounting plate 30. The swivel-mounting base 34 is shown mounted to the lower rotational mounting plate 30. This mounting apparatus allows the spot light to be rotated through 360 degrees in latitude and at least 90-degrees in elevation for positioning on to a display.

Figure 5:
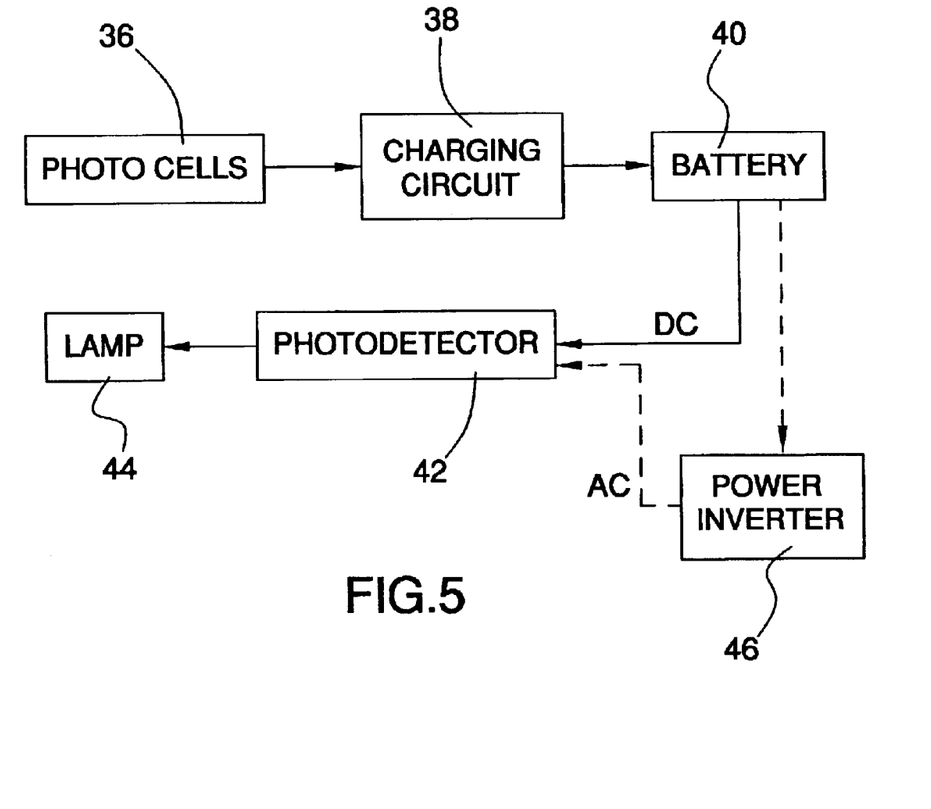
FIG. 5 is a block diagram showing the electrical charging and activation characteristics of the ornamentation spotlight of the present invention.

FIG. 5 is a block diagram showing the electrical charging and activation characteristics of the ornamentation spotlight of the present invention. Batteries are used to supply power directly to dc type lamps or to a power inverter, which then supplies power in the case of ac type lamps. A photovoltaic solar panel (photo cells) 36, along with charging circuitry 38, is used to fully charge the batteries 40 during daytime. The batteries then supply power to the lamp 44 at night. A photodetector 42 or timer-controlled switch is included in series with the power line to the lamp to turn the lamp on at nighttime. The spotlight can be wired to a 110-volt power line with rectifiers and/or power inverter 46 used to supply the appropriate power to the lamp.

Figure 6:
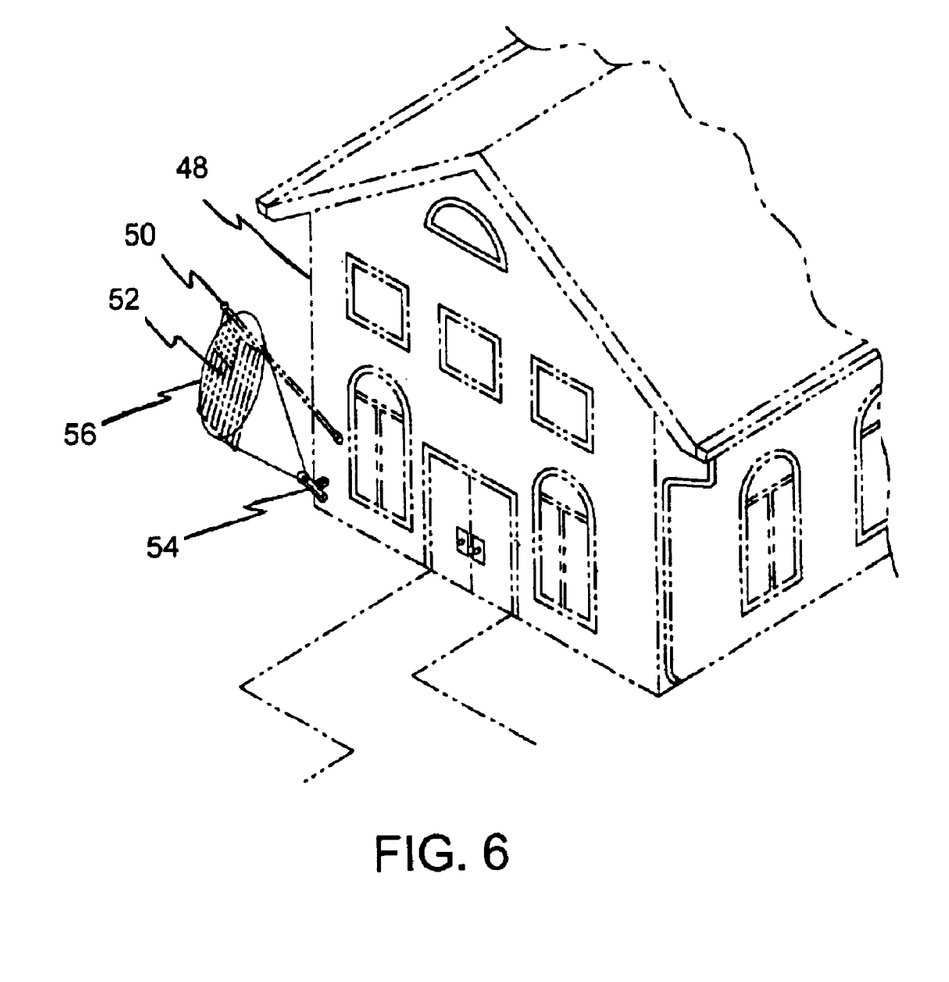
FIG. 6 is a perspective view showing a flag display system illuminated with the ornamentation spotlight of the present invention.

Finally, FIG. 6 is a perspective view showing the ornamentation spotlight of the present invention in use, illuminating a flag display attached to a house or building. Here a flagpole 50 and attached flag 52 are mounted on the side of a building 48. The ornamentation spotlight 54 is also mounted on the building below the flag and positioned and focused to shine a spot of light 56 on the flag. Optionally, both the flagpole 50 and the spotlight 54 can be mounted freestanding from the ground away from any structure.

While a preferred embodiment of the ornamentation spotlight has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, various types of lamps, such as incandescent, Xenon, or metal halide can be used in the spotlight. Also, various electrical power sources, both ac and dc, can be used with the light depending on the type lamp used. And although an ornamentation spotlight, primarily for use in displaying a flag at night, has been described, it should be appreciated that any ornamental display including flags, statutes, religious symbols, fountains, pictures, etc. can be brilliantly illuminated with the spotlight of the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An ornamentation display spotlight, comprising:
   a cylindrical housing, said housing having a removable end-cap attached to a first end, said housing protecting said spotlight from the elements;
   a rotational mounting plate attached to the center bottom of said housing;
   a swivel-mounting base attached to said rotational mounting plate for mounting said spotlight to a structure;
   a high-illumination light source assembly attached to a second end of said cylindrical housing, said light source assembly further comprising:
      a lamp;
      an optical reflector means mounted behind said lamp for collecting and reflecting light outward from said assembly;
      an optical projection lens means for focusing a variable spot size of light on to said display; and
      an outer dome for protecting said light source assembly from the elements;
   rechargeable batteries installed in said cylindrical housing by inserting through said first end having said removable end-cap, said batteries providing power to said lamp;
   a photovoltaic solar panel mounted on the top surface of said cylindrical housing opposite said rotational mounting plate;
   a battery charger circuit attached to the output of said solar panel for charging said batteries during the daytime; and
   a photo sensor switch mounted to the top of said cylindrical housing opposite said rotation mounting base, said switch wired in series with said lamp, for activating said lamp at night.

2. The spotlight of claim 1, wherein the type of said lamp is from the group comprised of: incandescent, Xenon, and metal halide.

3. The spotlight of claim 1, said optical reflector means further comprises an elliptical mirror for concentrating a maximum amount of light from said lamp into a spot of light.

4. The spotlight of claim 1, said optical lens means further comprising a projection type lens for projecting a spot of light on said display.

5. The spotlight of claim 4, wherein the said projection lens means has zoom capability, thereby allowing the diameter of said spot of light to be adjusted to fully illuminate said display.

6. The spotlight of claim 1, wherein power to said spotlight is supplied from a 110-volt power line.

7. The spotlight of claim 2, wherein a power inverter is coupled between said batteries and said lamp to provide ac power to said lamp.

8. The spotlight of claim 1, wherein said rotational mounting plate is adjustable through 360-degrees, thereby allowing said spot of light to be positioned onto said ornamental display.

9. The spotlight of claim 1, wherein said swivel mounting base is adjustable through at least 90-degrees, thereby allowing said spot of light to be positioned on to said ornamental display.

10. A flag display for day or night viewing, comprising:
    a flag pole mounted to a house or building;
    a flag attached to said flagpole;
    an illumination spotlight mounted to said building, said spotlight adjusted to cast a spot of light on said flag, said spotlight further comprising:
       a cylindrical housing, said housing having a removable end-cap attached to a first end, said housing protecting said spotlight from the elements;
       a rotational mounting plate attached to the center bottom of said housing;
       a swivel-mounting base attached to said rotational mounting plate for mounting said spotlight to a structure;
       a high-illumination light source assembly attached to a second end of said cylindrical housing, said light source assembly further comprising:
          a lamp;
          an optical reflector means mounted behind said lamp for collecting and reflecting light outward from said assembly;
          an optical projection lens means for focusing a variable spot size of light on to said display, and
          an outer dome for protecting said light source assembly from the elements;
       rechargeable batteries installed in said cylindrical housing by inserting through said first end having said removable end-cap, said batteries providing power to said lamp;
       a photovoltaic solar panel mounted on the top surface of said cylindrical housing opposite said rotational mounting plate;
       a battery charger circuit attached to the output of said solar panel for charging said batteries during the daytime; and
       a photo sensor switch mounted to the top of said cylindrical housing opposite said rotation mounting base, said switch wired in series with said lamp, for activating said lamp at night.

11. The display of claim 10, wherein the type of said lamp is from the group comprised of: incandescent, Xenon, and metal halide.

12. The display of claim 10, said optical reflector means further comprises an elliptical mirror for concentrating a maximum amount of light from said lamp into a spot of light.

13. The display of claim 10, said optical lens means further comprising a projection type lens for projecting a spot of light on said display.

14. The display of claim 13, wherein the projection lens means has zoom capability, thereby allowing the diameter of said spot of light to be adjusted to fully illuminate said display.

15. The display of claim 10, wherein power to said spotlight is supplied from a 110-volt power line.

16. The display of claim 10, wherein a power inverter is coupled between said batteries and said lamp to provide ac power to said lamp.

17. The display t of claim 10, wherein said rotational mounting plate is adjustable through 360-degrees, thereby allowing said spot of light to be positioned on to said ornamental display.

18. The display of claim 10, wherein said swivel mounting base is adjustable through at least 90-degrees, thereby allowing said spot of light to be positioned on to said ornamental display.

19. The display of claim 10, wherein:

said flag pole is mounted free-standing, extending up from the ground; and said spotlight is mounted on the ground surface, said spotlight being positioned upward on to said flag.

20. An ornamental spotlight in combination with an ornamental display, comprising:

an ornamental display; and an illumination spotlight mounted to cast a spot of light on said display, said spotlight further comprising: a cylindrical housing, said housing having a removable end-cap attached to a first end, said housing protecting said spotlight from the elements, a rotational mounting plate attached to the center bottom of said housing, a swivel mounting base attached to said rotational mounting plate for mounting said spotlight to a structure, a lamp connected to said second end of said cylindrical housing, an optical reflector means mounted behind said lamp for collecting and reflecting light outward from said assembly, an optical projection lens means for focusing said reflected light into a variable size spot of light, rechargeable batteries installed in said cylindrical housing by inserting through said first end having said removable end-cap, said batteries providing power to said lamp, a photovoltaic solar panel mounted on the top surface of said cylindrical housing opposite said rotational mounting plate, the output of said solar panel connected to battery charging circuitry, the output of said battery charging circuitry connected to said batteries for charging said batteries during the daytime, and a photo sensor switch mounted to the top of said cylindrical housing opposite said rotation mounting base, said switch wired in series with said lamp, for activating said lamp at night.

* * * * *